United States Patent [19]

Ebner et al.

[11] Patent Number: 5,384,620
[45] Date of Patent: Jan. 24, 1995

[54] SCHEDULING PAGE PARAMETER VARIATIONS FOR DISCRETE JOB ELEMENTS

[75] Inventors: Fritz F. Ebner, Rochester; Ronald C. Macera, Palmyra; Shelly D. Sulenski, Walworth; Janine M. Gates, Rochester; Sue Mikolanis, Ontario; James D. Richar, Penfield; M. Kerrigan Hawes, Pittsford, all of N.Y.

[73] Assignee: Xerox Corporation, Stamford, Conn.

[21] Appl. No.: 200,376

[22] Filed: Feb. 22, 1994

Related U.S. Application Data

[63] Continuation of Ser. No. 937,323, Aug. 31, 1992, abandoned.

[51] Int. Cl.⁶ .............................................. G03G 21/00
[52] U.S. Cl. .................................................. 355/202
[58] Field of Search .............................. 355/200, 202

[56] References Cited

U.S. PATENT DOCUMENTS

| | | | |
|---|---|---|---|
| 3,013,890 | 12/1961 | Bixby | 355/326 X |
| 4,618,246 | 10/1986 | Nagashima et al. | 355/200 |
| 4,627,715 | 12/1986 | Kikuno | 355/206 |
| 4,693,590 | 9/1987 | Umeda | 355/313 |
| 4,711,560 | 12/1987 | Hosaka et al. | 355/200 |
| 4,734,739 | 3/1988 | Inuzuka et al. | 355/308 |
| 4,760,608 | 7/1988 | Suzuki | 382/61 |
| 4,930,016 | 5/1990 | Yazawa et al. | 358/296 |
| 4,963,920 | 10/1990 | Fukushima | 355/244 X |
| 4,970,554 | 11/1990 | Rourke | 355/202 |
| 4,970,661 | 11/1990 | Tsuzuki et al. | 355/202 X |
| 5,146,344 | 9/1992 | Bennett et al. | 355/202 X |
| 5,170,340 | 12/1992 | Prokop et al. | 355/202 |

FOREIGN PATENT DOCUMENTS 461671 12/1991 European Pat. Off. .

Primary Examiner—Fred L. Braun
Attorney, Agent, or Firm—Oliff & Berridge

[57] ABSTRACT

A system for providing a memory for storing page mode parameters and a controller for providing images in optional page modes for producing a set of images with discrete elements of the set of images processed in a selected page mode independent of the page mode of other elements. This is accomplished by identifying elements of the set of images with page mode parameters and responding to the page mode parameters to alter the operation of the machine dependent upon the identified page mode parameters.

23 Claims, 6 Drawing Sheets

SCHEDULING PAGE PARAMETER VARIATIONS FOR DISCRETE JOB ELEMENTS

This is a continuation of application Ser. No. 07/937,323 filed Aug. 31, 1992, now abandoned.

BACKGROUND OF THE INVENTION

This invention relates generally to methods and apparatus for scheduling the printing or reproduction of images and, more particularly, to the separate scheduling of the printing or reproduction of images in response to the identification of the parameters for printing or reproducing each individual image.

If imaging machines are to become more versatile in completing complex jobs, the machine control must be able to adapt to a wide variety of requirements in an efficient manner. Modern business and document needs oftentimes dictate the need for multi color prints or images in a variety of colors, usually interspersed among other black and white documents. In addition, there is often the demand for selected images in a set to incorporate other features such as simplex or duplex mode or differing paper types, sizes and/or orientations. A suitable control must be able to accurately and efficiently schedule the machine for coordinating these various features in a complex set of images wherein many of the images require individually tailored feature parameters to provide an accurate completed set.

Various prior art techniques are directed to the control of machines with multi-modes of operation, for example:

U.S. Pat. No. 4,627,715 to Kikuno discloses a programmable copier capable of making copies from a plurality of originals in accordance with copy information temporarily stored in a memory. The copier is provided with a CPU for checking the total number of copies to be made for a copy job.

U.S. Pat. Nos. 4,618,246 to Nagashima et al., 4,734,739 to Inuzuka et al. and 4,760,608 to Suzuki all disclose image forming devices which contain programmable memories for controlling image formation in accordance with parameters set in a memory.

U.S. Pat. No. 4,693,590 to Umeda discloses an electronic copier selectively operable in a multi-job mode for continuously copying a plurality of groups of documents which differ in copying condition from each other. In response to a copy start signal, single display means displays job data associated with one group of documents which are to be copied.

U.S. Pat. No. 4,711,560 to Hosaka et al. discloses an image processing apparatus having a removable medium containing programs for controlling the apparatus so that the apparatus is capable of performing multiple functions by means of the programs. The programs are controllable by a monitor program provided in the apparatus;

Several useful methods are known for making copies having plural colors, for example, U.S. Pat. No. 3,013,890 To W. E. Bixby in which a charge pattern of either a positive or negative polarity is developed by a single, two-colored developer.

However one difficulty with the prior art systems is the limitation to only one highlight color and the inability to select discrete images, pages, or copy sheets in an image set to receive distinct color images. Another difficulty is to be able to provide other features such as discrete pages in the simplex or duplex mode in the image set. Yet another difficulty is to be able to provide for discrete pages having differing paper types, sizes and/or paper orientations. In particular, it is desirable to be able to print distinct images having two or more highlight colors as well as black and white in an image set, in addition to providing selected simplex or duplex modes and a wide range of paper options.

SUMMARY OF THE INVENTION

It is an object, therefore, of the present invention to provide a new and improved system for providing multiple colors to selected images of an image set.

Another object of the present invention is to provide a method of designating individual color images in an image set in either a simplex or duplex mode.

Another object of the present invention is to be able to adjust machine timing or delay machine timing pitches in order to selectively apply different color modes to individual images in an image set.

Another object of the present invention is to be able to provide for a plurality of paper types, sizes and/or orientations in an image set.

Another object of the present invention is to maximize the system throughput.

Other advantages of the present invention will become apparent as the following description proceeds, and the features characterizing the invention will be pointed out with particularity in the claims annexed to and forming a part of this specification.

The present invention is concerned with a system for providing a memory for storing electronic images with reproduction mode parameters and a controller for providing images in optional modes for producing a set of images with discrete elements of the set of images processed in a selected mode independent of the mode of other elements. This is accomplished by identifying elements of the set of images with page mode parameters and responding to the page mode parameters to alter the operation of the machine dependent upon the identified page parameters. The machine pitches are also changed to provide additional features such as simplex and duplex mode to selected images. The machine pitch skip are also controlled to minimize dead time and maximize system throughput.

DESCRIPTION OF THE DRAWINGS

For a better understanding of the present invention, reference may be had to the accompanying drawings wherein the same reference numerals have been applied to like parts and wherein.

DETAILED DESCRIPTION OF THE PREFERRED EMBODIMENT

Figure 1:
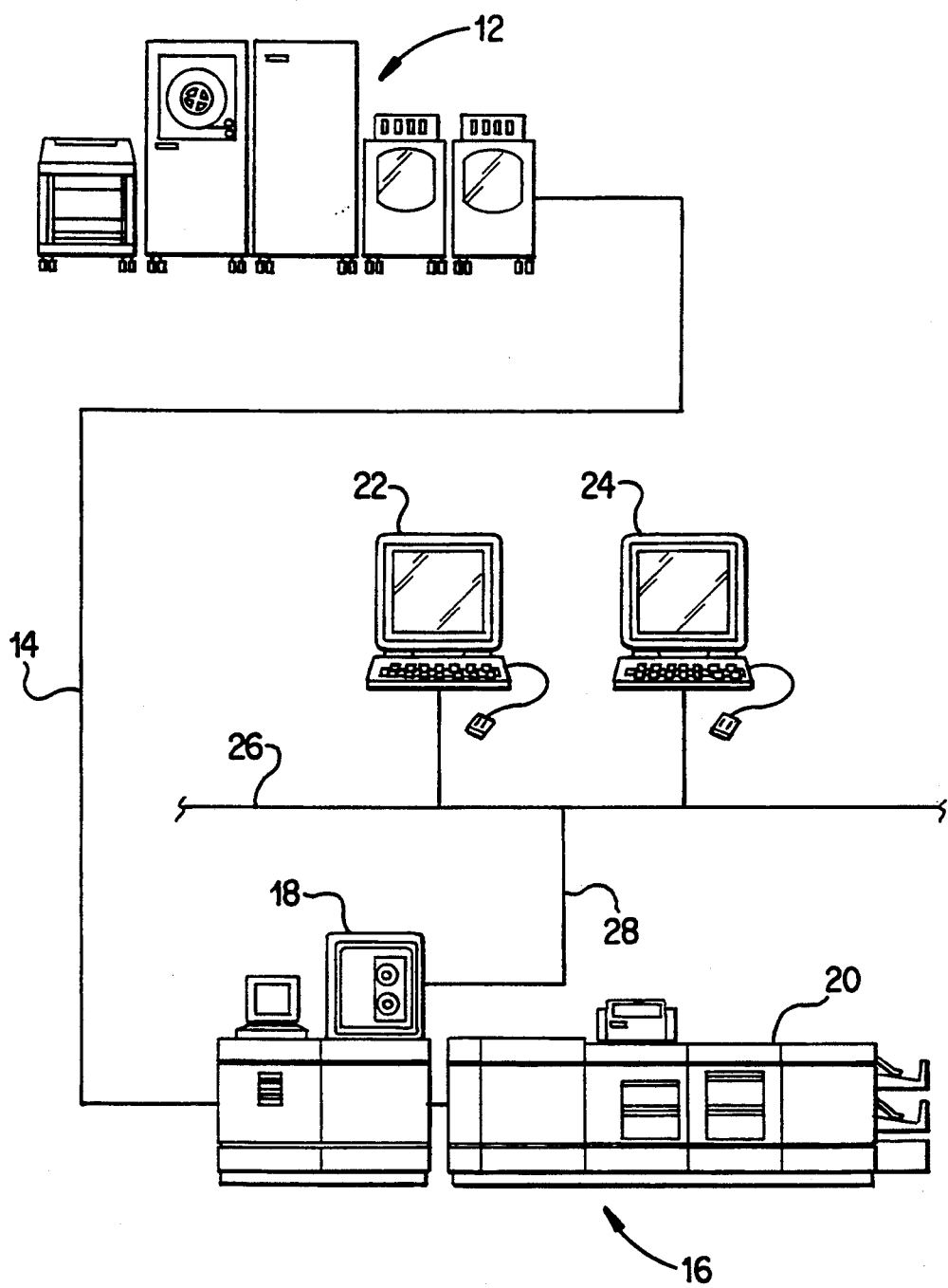
FIG. 1 is a block diagram of a typical network incorporating the present invention.

With respect to FIG. 1, there is generally illustrated an information transmission and printing system suitable for incorporating the present invention. In particular, a central computer system 12, is interconnected over a communication line 14 to an electronic imaging and printing system generally illustrated at 16 including an electronic subsystem 18 and an input output terminal 20 (IOT) For details of a typical electronic imaging and printing system, reference is made to U.S. patent Ser. No. 07/922,888 filed Jul. 29, 1992 to Douglas et al., incorporated herein. In addition, various workstations or network users are illustrated at 22 and 24 connected to a common network 26, in turn the common network 26, is interconnected to electronic subsystem (ESS) 18 via communication channel 28. It should be understood that FIG. 1 is merely exemplary of many typical communication networks interconnecting various workstations and users to a common printing system. It should also be understood that IOT 20 can also be a xerographic copier as well as a xerographic printer.

Figure 2:
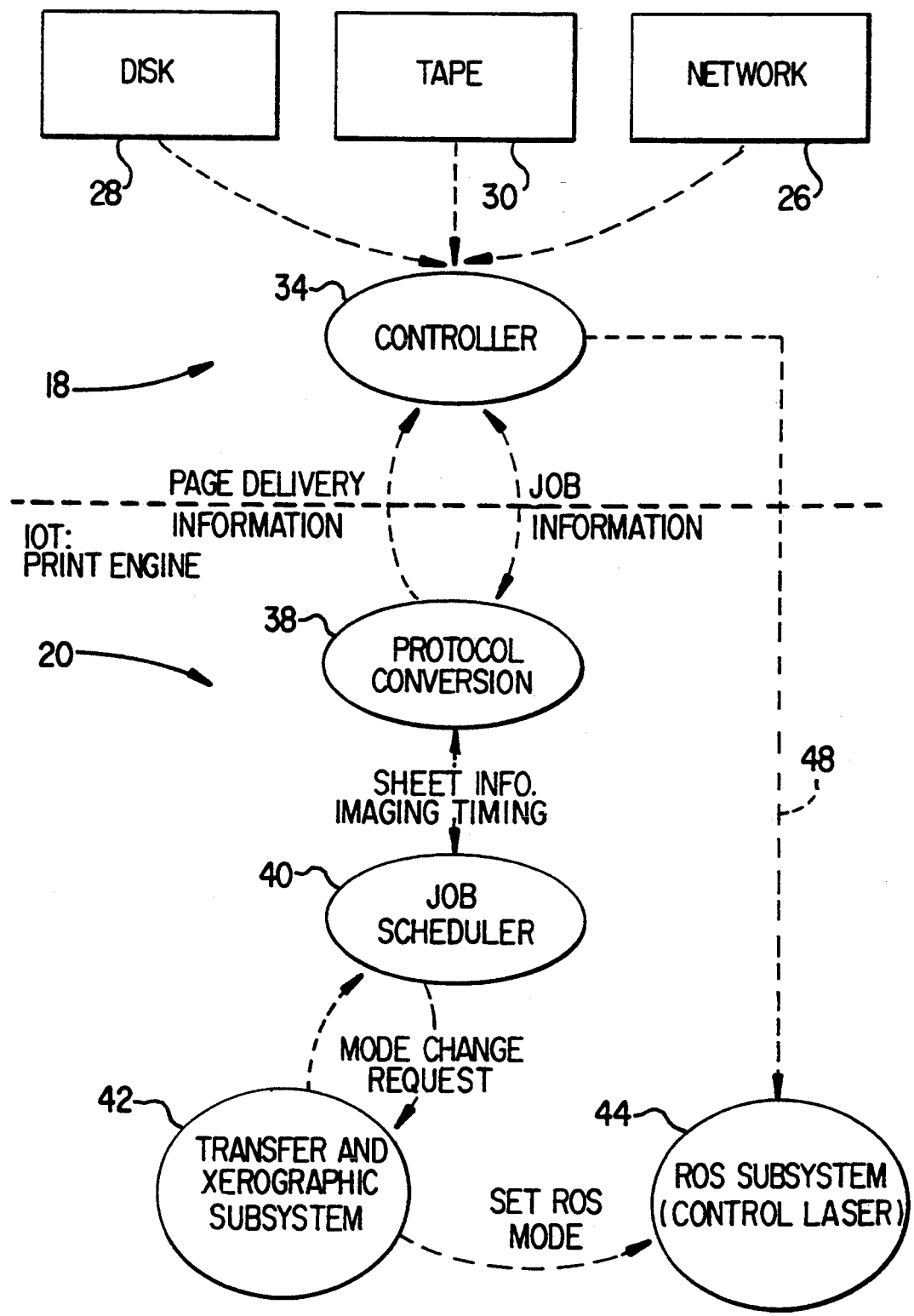
FIG. 2 is a diagram of the control in accordance with the present invention.

With reference to FIG. 2, there is illustrated in general diagram form the job scheduling technique in accordance with the present invention. The scheduling technique allows the machine to cycle up in a given mode and yet be able to schedule discrete elements of a printer job in alternate modes to the given cycled-up mode. Any given mode is defined certain parameters, including one or more of color, image source, paper type, paper size, paper orientation or simplex/duplex. In specifying a color parameter, a printer job can be scheduled for either full-color, high light color, monochrome-color or monochrome-black imaging. The job scheduling technique of the present invention allows for any one or all of the page mode parameters to be changed on a sheet by sheet basis without cycling down the printer.

The job scheduling technique, or page programming, responds to any print job received by the IOT 20. In a printer-type IOT 20, such as a 4-color laser printer, the print job will comprise a plurality of page-length images to be output. In the preferred embodiment of the printer-type IOT 20, the page mode parameters include the color mode, the image source mode, and the paper mode. In the preferred embodiment, the page mode parameters and the image data are provided as separate data streams, and the page mode parameters for all the images of the job are provided at the beginning of the job, while the image data are provided on a page by page basis. Alternatively, each page-length image could have its particular page mode parameters for that page of output embedded within the data defining the image.

In a copier-type IOT 20, such as a 4-color laser copier, the print job will comprise a plurality of page-length documents. In the preferred embodiment of the copier-type IOT 20, the page mode parameters include the color mode and the paper mode. In the preferred embodiment, a job ticket defines the primary page mode parameters and the differing mode parameters for individual documents. However, any known method for providing the page mode parameters to the IOT can be used. For example, the copier-type IOT 20 could comprise sensors for determining document size, document orientation, color mode and the like. The sensor outputs would then provide the differing page mode parameters for each individual document.

When a start print command to print a particular print job is received by the IOT 20, the job scheduler 40 will cause the IOT 20 to cycle up for a number of pitch skips as the subsystems of the IOT 20 are initialized for the main page mode parameters for the print job. For a laser-type 4-color IOT, these subsystems include the transfer subsystem, the fuser, the developer, and the paper transport. Particularly, the transfer and xerographic subsystem 42 (hereinafter "transfer subsystem 42"), or "TRTL", must be initialized based on which of the 4 colors will be used; the fuser and developer must be initialized based on how many of the 4 colors will be used; and the paper transport must be initialized to supply the selected output paper and possibly the selected simplex or duplex mode.

Each of the output pages of the present job may have discrete page mode parameters. To set up the IOT 20 to specific page mode parameters, mode change requests are received from the controller 34. When a start print command is received by the IOT 20, the job scheduler 40 will cause the IOT 20 to generate pitch skips as required while initiating the mode changes to provide the specific page mode parameters for the particular image or document of the job.

If, for example, there is a mode change received from the controller 34 from one output page to the next within a job, a scheduling sequence providing for the transition from one mode to another is organized to allow each subsystem of the IOT 20 time to finish the last output paper of the current mode before beginning any new output pages of the next mode. In both the copier-type IOT and printer-type IOT 20, an independent page count is maintained for each subsystem, so that as each page exits a subsystem, the page mode parameters for the next page are used to initialize the subsystem independently of the status of any other subsystem.

In addition, when printing in a duplex mode, mode changes in the transfer subsystem from one output page to the next are accomplished by delaying the beginning of side one of the subsequent duplex output page until side 2 of the current output page has been imaged. Further, in mode changes between simplex and duplex, the job scheduler 40 will delay providing the mode changes for each subsystem to the paper transport until the last output page of the current mode has exited that subsection. Likewise, in most mode changes, the job scheduler 40 will delay providing the mode changes to the fuser or developer until the last output page of the current mode has exited the fuser or developer. In this manner, the number of pitch skips needed to provide the correct timing cycles can be minimized, thereby maximizing the throughput and the overall efficiency of the system. This also avoids having to completely cycle-down the IOT 20, or requiring a time-equivalent number of pitch skips.

With reference to FIG. 2, the diagram is divided into the electronic subsystem 18, shown above the dotted line and the IOT 20, shown below the dotted line. The ESS 18 comprises the controller 34 having the primary function of setting up job information, including page mode parameters, for the IOT 20. In a printer-type IOT 20, job information can be communicated to the controller 34 from various job sources such as a disk 28, a tape 30, or a network 26. In other words, a job source could have been set up by an operator and stored on disk 28, set up by the operator and stored on tape 30, or a job source or document could have been created by a network user and the information sent to the controller via the network 26.

In the preferred embodiment of the copier-type IOT 20, job information for the entire job, comprising the document image data and the page mode parameters, is supplied by an operator and immediately used to scan and copy the documents. Alternatively, the documents can be scanned and stored and the operator-input mode parameters stored, to allow for subsequent reproduction as with the printer-type IOT 20. Additionally, the copier-type IOT 20 can be provided with sensors for determining the page mode parameters on a page-by-page basis as each page is input, so that operator inputting of the page mode parameters can be avoided.

Within the print engine 20, there is a protocol conversion operator 38 for decoding and packing job information for the IOT 20 or the controller 34. The protocol conversion operator 38 is interconnected to job scheduler 40 that handles the overall IOT job scheduling and exchanges sheet information imaging and imaging timing information with the protocol conversion operator 38. The job scheduler 40 conveys mode change requests to the transfer subsystem 42 of the printer 20 and provides suitable pitch skips within the transfer subsystem 42 for the appropriate mode changes, including the appropriate setting of the raster output scanner ROS 44 of the IOT 20. As illustrated, there is also a communication link 48 between controller 34 and ROS 44 to convey image data information.

Figure 3A:
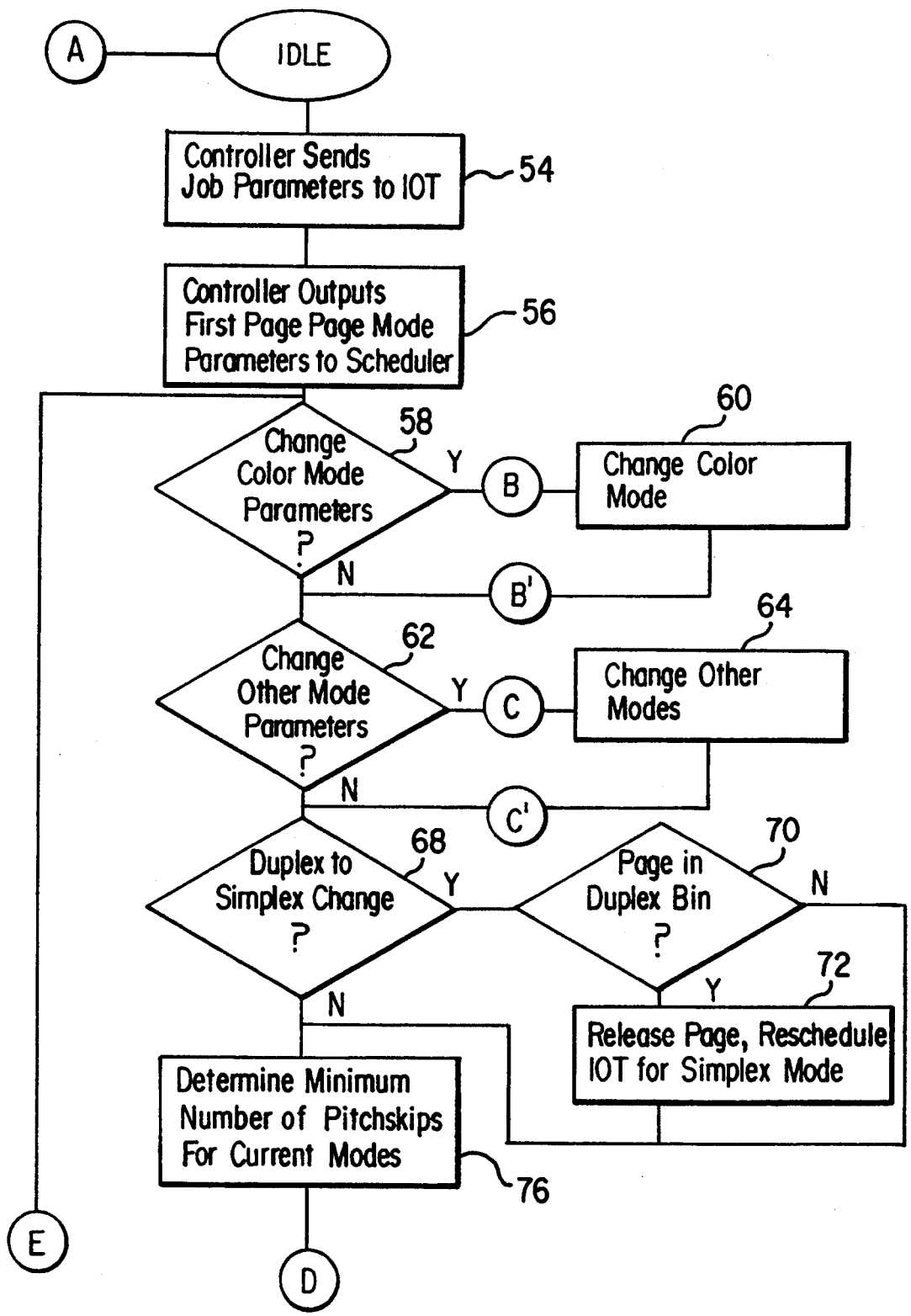
FIGS. 3A and 3B are a flowchart illustrating the scheduling of mode and format job transitions in accordance with the present invention.
Figure 3B:
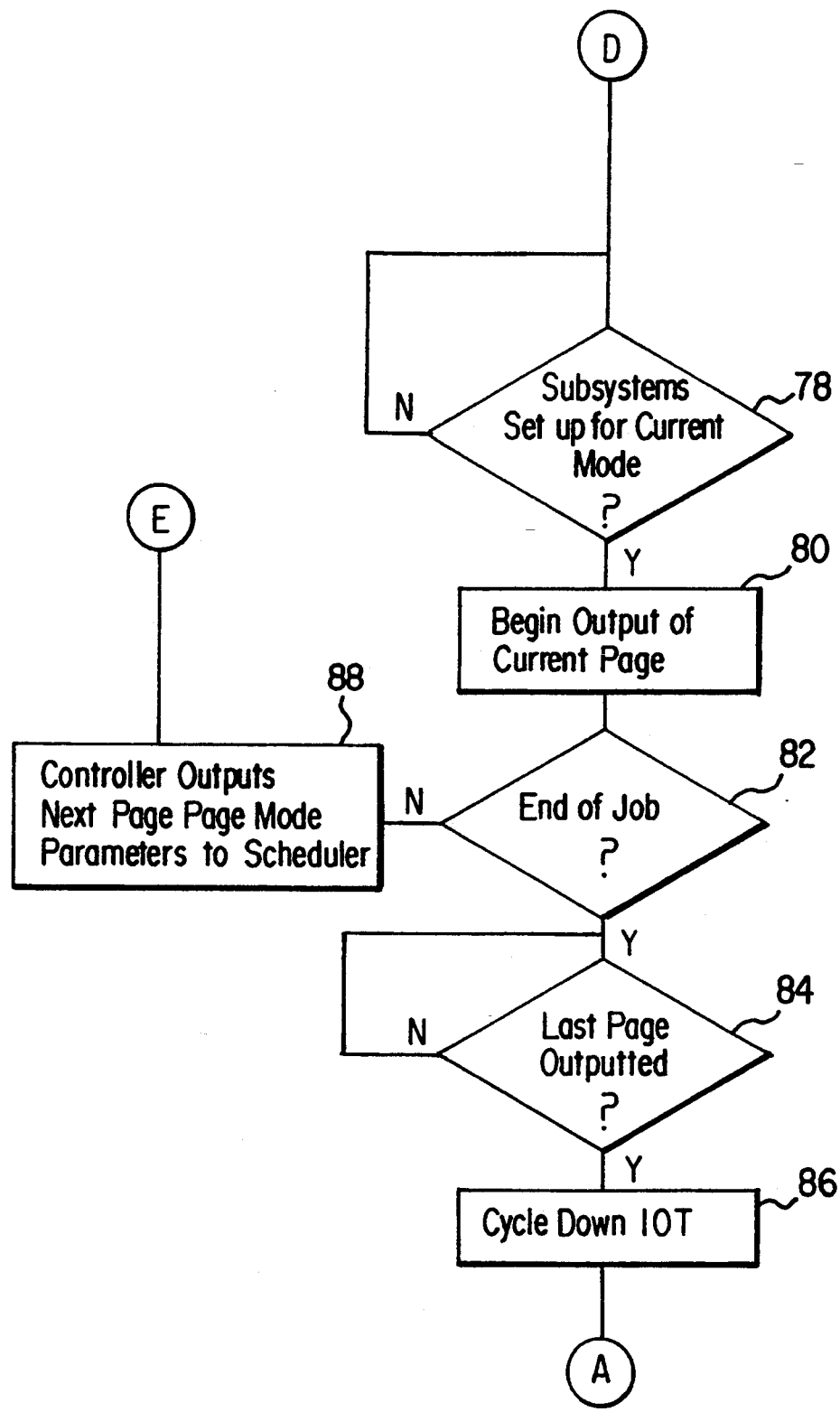

With reference to FIGS. 3A and 3B, there is illustrated a flow chart of the scheduling technique in accordance with the present invention. Assume that the IOT 20 is in an idle mode as illustrated at step 52. With reference to step 54, the controller 34 sends initial job parameters specifying the main page mode parameters, configures the paper transport and schedules the necessary pitch skips for the selected parameters. In other words, this could be parameters for identifying a particular color mode, such as full-color, highlight color, monochrome-color or monochrome-black, whether or not the job is to be in simplex or duplex mode and the particular paper size, orientation, and type to be used.

The paper size and orientation are as conventionally understood. By paper type, or tray, it should be understood that on producing a particular job, even though the paper size and orientation remain constant, different paper trays having, for example, a first page letter head, a subsequent page letter head, a no letter head letter-quality paper or a draft-quality paper, may be desired. By identifying different types of a paper, for example, by tray, and allowing for different trays to be accessed by the paper transport during a single job, complex documents can be easily produced.

At step 54, the start print is activated to cycle up the IOT 20. At step 56, the page parameters for the first page are input, and at step 58, the controller 34 determines whether or not a color mode parameter change has to be made for the first output page from the main page mode parameters of the current job.

Figure 3C:
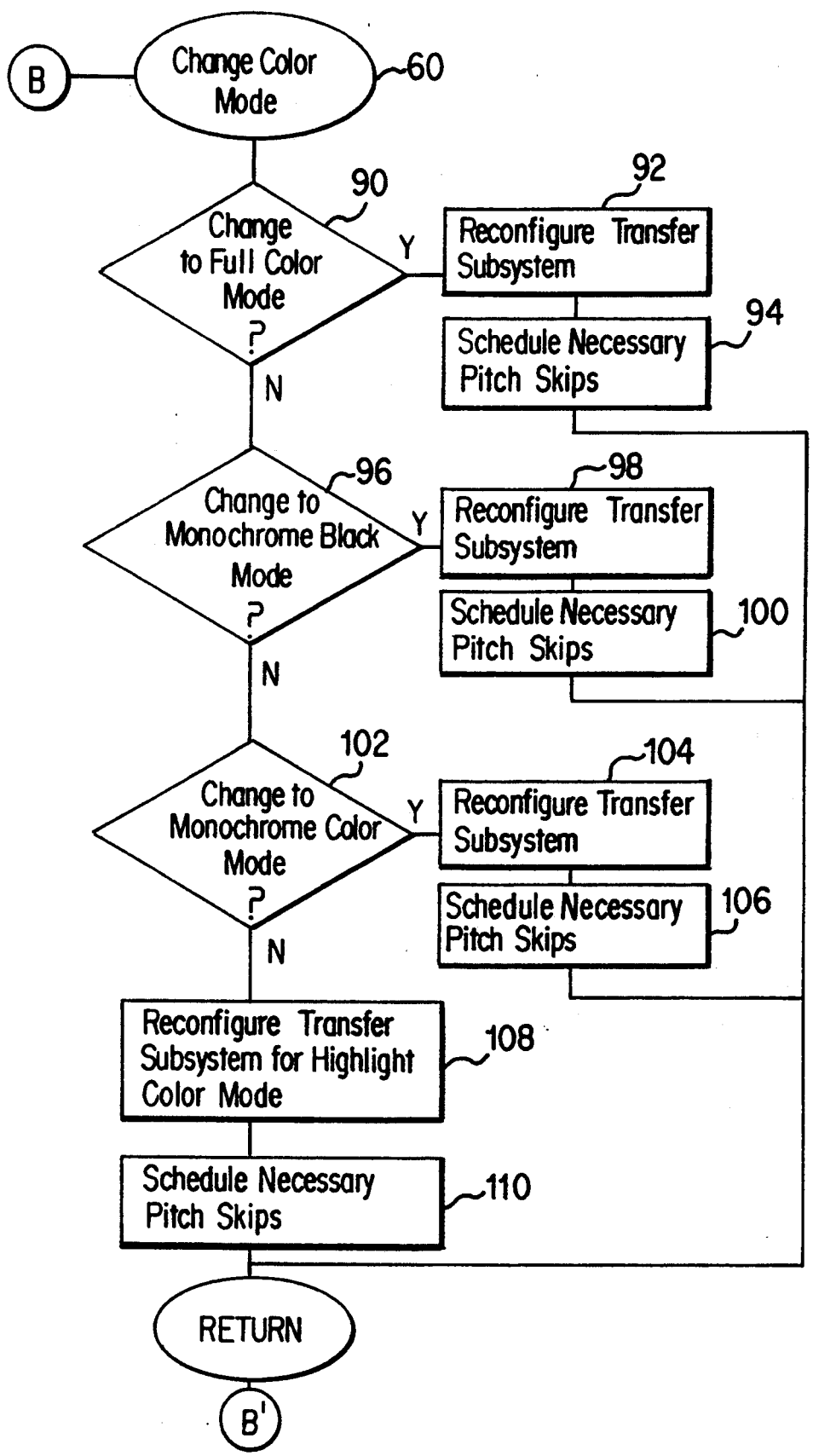
FIGS. 3C and 3D are flow charts illustrating the determining of page mode parameters and job format transitions of FIGS. 3A and 3B.

If there is to be a change in the color mode parameters, a color mode change request is sent to the transfer system 42 in step 60. In particular, as shown in FIG. 3C, changing the color mode parameters in step 60 involves determining which color mode is specified in steps 90, 96 and 102 and setting up a job schedule for this page to cause the paper transport to cycle the paper through the transfer subsystem 42 the required number of cycles in steps 92, 98, 104 and 108. Additionally, in steps 94, 100, 106 and 110, the job scheduler 40 determines the minimum number of pitch skips for the paper transport, the fuser and the developer between the preceding page and the current page. The pitch skips must be schedule to these subsystems so that they maintain the proper operating conditions for each page as it passes through them, and so that one page does not interfere with another.

For example, a full color page requires more cycles through the transfer subsystem 42, and different operating conditions and longer periods within the fuser and developer subsystems than a monochrome page. If the proper 4-color set up for the fuser or developer were not scheduled to coincide with the four-color page, the page would have to be discarded. Likewise, if the next page were monochrome, a minimum number of pitch skips are necessary to keep the monochrome page from overtaking the full;color page, and to allow the fuser or developer to be set-up and stabilized for a monochrome page.

Figure 3D:
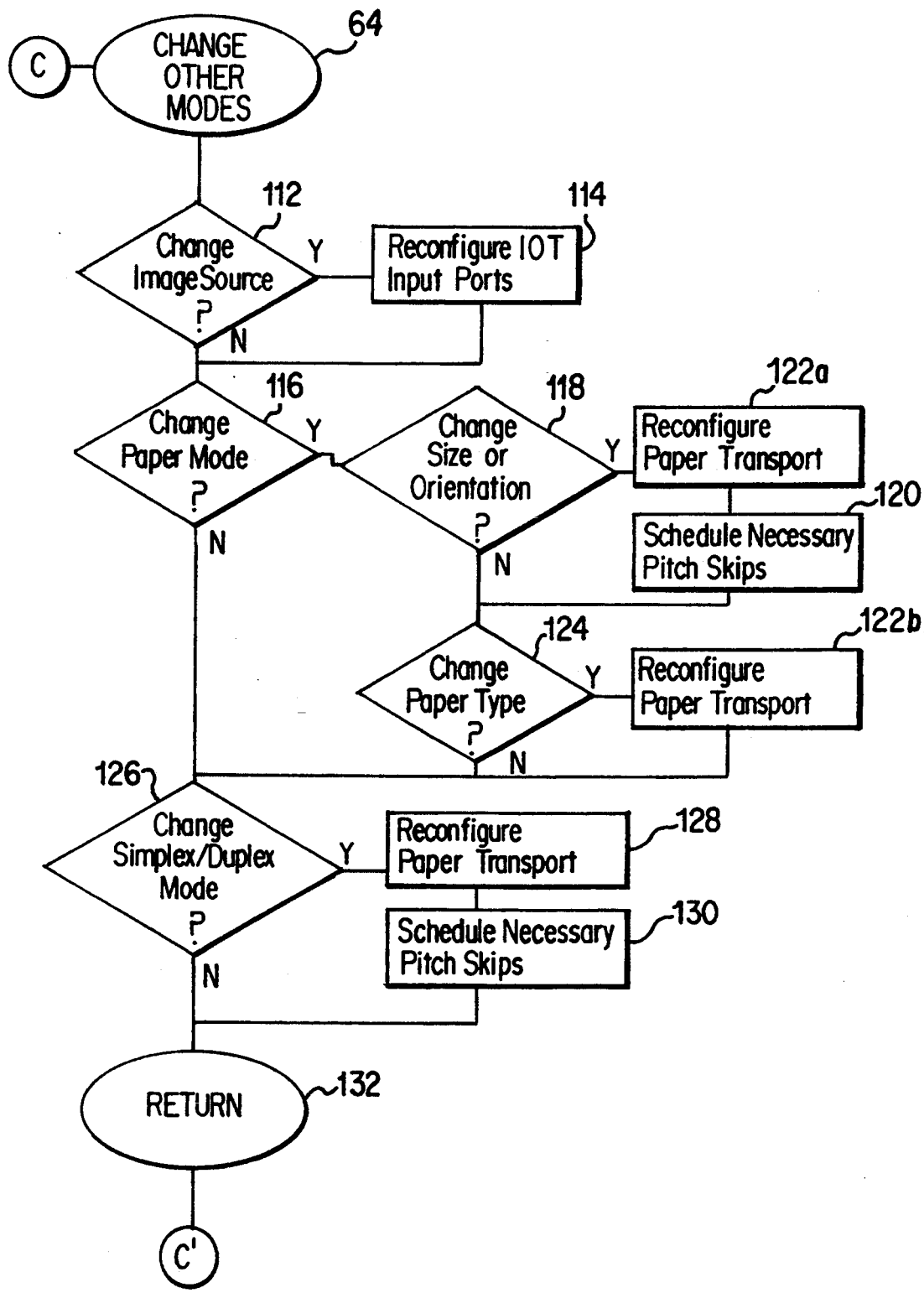

Once the IOT is set up for the current color mode, step 62 determines if any other mode parameter changes are required. In particular, as shown in FIG. 3D, to change the other mode parameters in step 64 the controller determines if a change in the image source is required in step 112. If so, in step 114, in a printer-type IOT 20, the input ports to the ESS 18 are reconfigured to input the current image source, while in a copier type IOT 20, the IOT 20 is reconfigured between inputting image data from the ESS 18, as in the printer-type IOT 20, or directly imaging a document presented to the copier-type IOT 20.

Once the IOT and/or the ESS 18 has been reconfigured, if necessary, for the current image source, the controller, in step 116, determines if there is any change in the paper to be supplied. In step 118, the controller determines if the change is to a different paper size or orientation. If so, in step 120, the job scheduler schedules the necessary pitch skips for this size and orientation of paper. In step 122a, the controller reconfigures the paper path for the selected paper. If there is no paper size or orientation, changes, then there must be a paper type change. In step 124, the controller 34 determines which paper type of the current paper size/orientation is specified, and continues to step 122b to reconfigure the paper transport. After determining if there is a paper mode parameter change, the controller 34, in step 126, determines if there is a change from duplex to simple printing, or vice versa. If there is no change, the process continues to step 132 and ends the process of step 64. If the copier-type IOT 20 or printer-type IOT 20 can output duplex (two-sided) documents, the controller 34 continues to step 126. In the preferred embodiments, duplex mode is not provided, and the controller 34 continues on directly to step 76. If there is a simplex-duplex mode parameter change, the controller 34, in step 128, reconfigures the paper transport, and the job scheduler 40, in step 130, schedules the required number of pitch skips, then control is again returned to step 64.

In step 68, the controller 34 determines if there was a mode parameter changed from duplex to simplex. If not, control continues to step 76. If so, in step 70, the controller 34 determines if there is a page waiting in the duplex bin for second side imaging. If not, control continues to step 76. If so, the page is released from the duplex bin and the IOT subsystems are reschedule for the current page as a simplex page. Control then continues to step 76.

In step 76, the job scheduler 40 minimizes the scheduled number of print skips for the current page mode parameters. In step 78, the controller waits for the IOT subsystems to indicate they are ready for the next page to being. In step 80, the next page is begun. In step 82, the controller checks to see if the current job is done. If so, the IOT is cycled down to an idle state (step 86) after the last page is completed (step 84). Otherwise, in step 88, the next page's page mode parameters are accessed, and control jumps to step 58.

While there has been illustrated and described what is at present considered to be a preferred embodiment of the present invention, it will be appreciated that numerous changes and modifications are likely to occur to those skilled in the art, and it is intended to cover in the appended claims all those changes and modifications which fall within the true spirit and scope of the present invention.

What is claimed is:

1. In a machine having a controller for providing images having optional page mode parameters, the method of providing a set of images with a discrete element of the set of images processed using selected page mode parameters independent of the page mode parameters of other elements of the set of images, including the steps of:
   (a) identifying a plurality of page mode parameters of a current element of the set of images;
   (b) responding to the plurality of page mode parameters of the current element to provide the current element of the set of images in a current page mode;
   (c) identifying a plurality of page mode parameters of a next element of the set of image;
   (d) updating the plurality of page mode parameters of the next element that are different from the plurality of page mode parameters of the current element to provide the next element of the set of images in a next page mode, the controller altering an operation of the machine after completing the processing of the current element by modifying only the page mode parameters that are different and disregarding the next page mode parameters that match the current page mode parameters; and
   (e) repeating steps (c) and (d) for each succeeding element of the set of images.

2. The method of claim 1 wherein the page modes include color modes.

3. The method of claim 2, wherein the color modes are full-color, monochrome-black, monochrome-color and highlight color.

4. The method of claim 1, wherein the page modes include paper modes.

5. The method of claim 4, wherein the paper modes include at least one of size modes, orientation modes and tray modes.

6. The method of claim 1, wherein the page modes include simplex and duplex modes of operation.

7. The method of claim 6, wherein the steps of responding to the page mode parameters include the step of delaying the scheduling of side 1 of the subsequent duplex page until side 2 of the current page has been imaged by a transfer subsystem of the machine.

8. The method of claim 1 wherein the steps of responding to the page mode parameters of the current element to provide the current element of the set of images in said current page mode and responding to the page mode parameters of the next element to provide the next element of the set of images in said next page mode include the steps of altering timing cycles in the machine.

9. The method of claim 8, wherein the step of altering the timing cycles includes the step of scheduling pitch skips.

10. The method of claim 1 wherein the controller includes a memory and including the step of transmitting page mode parameters to said memory.

11. The method of claim 10, wherein the page mode parameters are transmitted separately from the image data.

12. The method of claim 10, wherein the page mode parameters are transmitted as part of the image data.

13. The method of claim 10, including a remote station electrically connected to the controller through a network and including the step of transmitting the page mode parameters to said memory from the remote station.

14. In an electrostatographic copying apparatus having a plurality of page modes of operation and in which imaging material is applied to an image support surface and transferred from the image support surface to a moving copy member by electrical transfer means, the imaging material representing one of the plurality of page modes, the method of providing each copy member in a selected page mode independent of the page mode of other copy members by identifying current page mode parameters associated with a current copy member for a current page mode and next page mode parameters associated with a next copy member for a next page mode and responding to the current page mode parameters to provide the current page mode and after processing the imaging material of the current page mode, updating only the current page mode parameters to the next page mode parameters which are different than the current page mode parameters to provide the next page mode.

15. A method for maximizing image reproduction throughput of an image reproduction apparatus having a plurality of image reproduction subsystems and a controller and capable of reproducing images in optional page modes, the optional page modes defined by page mode parameters, the method comprising the steps of:
   inputting an image reproduction print job into the image reproduction apparatus, the print job comprising a plurality of images to be reproduced, a set of page mode parameters being associated with each image;
   reproducing a current image of the plurality of image, based on the set of page mode parameter associated with the current image;
   determining, for a next image of the plurality of images, whether any of the set of page mode parameters associated with the next image differ from the page mode parameters of associated with the current image;
   reconfiguring, for each differing page mode parameter of the set of page mode parameters associated with the next image, a corresponding subsystem of the plurality of subsystems; and
   reproducing the next image as the current image;
   wherein the reconfiguring step comprises, for each differing page mode parameter, the steps of:
   waiting for the corresponding subsystem to complete processing the current image;
   providing the differing page mode parameters to the corresponding subsystem;
   reconfiguring the corresponding subsystem based on the provided page mode parameter;
   delaying reproduction of the next image until the subsystem has finished reconfiguring;

determining if the provided page mode parameter will cause any downstream conflicts; and further delaying reproduction of the next image for a time sufficient to avoid any such conflicts.

16. The method of claim 15, wherein the page mode parameters are electronic tags associated with predetermined ones of the plurality of images.

17. The method of claim 15, wherein the page modes include independent color modes.

18. The method of claim 17, wherein the independent color modes include full-color, monochrome-black, monochrome-color and highlight color modes of operation.

19. The method of claim 15, wherein the page modes include paper modes.

20. The method of claim 19, wherein the paper modes include at least one of size modes, orientation modes and tray modes.

21. The method of claim 15, wherein the page modes include simplex mode and duplex mode.

22. The method of claim 15, wherein the step of reconfiguring the corresponding subsystem comprises the step of scheduling pitch skips in the machine.

23. The method of claim 15, wherein each subsystem responds independently to the page mode parameters.

* * * * *